United States Patent
Bollmann

(10) Patent No.: US 11,441,287 B2
(45) Date of Patent: Sep. 13, 2022

(54) STRUCTURAL ARRANGEMENT INTRODUCED INTO A SLEEVE CONNECTOR HAVING VARIOUS CROSS SECTIONS FOR TUBULAR METAL POSTS

(71) Applicants: TUPER S/A, Bairrio Brasilia (BR); Frank Bollmann, Sao Bento Do Sul-SC (BR)

(72) Inventor: Frank Bollmann, Sao Bento Do Sul-SC (BR)

(73) Assignee: Tuper S/A, São Bento Do Sul (BR)

( * ) Notice: Subject to any disclaimer, the term of this patent is extended or adjusted under 35 U.S.C. 154(b) by 0 days.

(21) Appl. No.: 16/763,887

(22) PCT Filed: Nov. 12, 2018

(86) PCT No.: PCT/BR2018/050416
§ 371 (c)(1),
(2) Date: May 13, 2020

(87) PCT Pub. No.: WO2019/090409
PCT Pub. Date: May 16, 2019

(65) Prior Publication Data
US 2020/0340200 A1    Oct. 29, 2020

(30) Foreign Application Priority Data
Nov. 13, 2017  (BR) .......................... 202017024392-9

(51) Int. Cl.
*E02D 5/52* (2006.01)
*E02D 27/42* (2006.01)
*F16B 7/04* (2006.01)

(52) U.S. Cl.
CPC ............. *E02D 27/42* (2013.01); *E02D 5/526* (2013.01); *E02D 2600/20* (2013.01)

(58) Field of Classification Search
CPC .......... E02D 5/52; E02D 5/523; E02D 5/526; E02D 2600/20; E02D 27/42;
(Continued)

(56) References Cited

U.S. PATENT DOCUMENTS 1,051,427 A * 1/1913 McCluskey ......... F16L 37/0925
                                                    285/322
1,188,485 A * 6/1916 Pruyn .................. F16L 37/252
                                                    285/27
(Continued)

FOREIGN PATENT DOCUMENTS

CN       202144590 U    2/2012
CN       202227334 U    5/2012
(Continued)

OTHER PUBLICATIONS

International Search Report for International Application No. PCT/BR2018/050416, 3 pages, dated Jan. 17, 2019.

*Primary Examiner* — Frederick L Lagman
*Assistant Examiner* — Stacy N Lawson
(74) *Attorney, Agent, or Firm* — Knobbe, Martens, Olson & Bear, LLP

(57) ABSTRACT

The present utility model relates to a sleeve connector (100) for joining tubular metal posts (300), comprising locking regions (120) provided with a ring of locking protuberances (121) of height (ht), which corresponds to from 0.15 to 4% of the external diameter (D) of the locking region (120) in order to promote the locking together of the ends of the tubular metal posts (300) by means of the mechanical deformation of the locking protuberances (121).

5 Claims, 8 Drawing Sheets

(58) Field of Classification Search
CPC .......... Y10T 403/559; Y10T 403/4966; F16L 37/025; F16L 33/30; F16L 21/002; F16B 7/0413

See application file for complete search history.

(56) References Cited

U.S. PATENT DOCUMENTS

| | | | | |
|---|---|---|---|---|
| 1,607,725 | A | | 11/1926 | Davis |
| 2,353,561 | A | * | 7/1944 | Hassett .................. E02D 5/523 |
| | | | | 285/322 |
| 3,851,980 | A | * | 12/1974 | Worth .................. F16B 7/0446 |
| | | | | 403/172 |
| 2014/0091532 | A1 | * | 4/2014 | Unger .................. F16L 27/113 |
| | | | | 277/616 |
| 2021/0033224 | A1 | * | 2/2021 | Wilkinson ............. F16L 17/04 |

FOREIGN PATENT DOCUMENTS

| | | | | |
|---|---|---|---|---|
| CN | 203007935 U | | 6/2013 | |
| CN | 204282351 U | | 4/2015 | |
| CN | 205875142 U | | 1/2017 | |
| CN | 207619977 U | | 7/2018 | |
| EP | 0624219 B1 | * | 7/1997 | ............ E04F 11/032 |
| GB | 974115 A | * | 11/1964 | ............ F16B 7/0413 |

\* cited by examiner

STRUCTURAL ARRANGEMENT INTRODUCED INTO A SLEEVE CONNECTOR HAVING VARIOUS CROSS SECTIONS FOR TUBULAR METAL POSTS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present utility model relates to the mechanical engineering and civil engineering field, notably of tubular metal elements, specially poles, posts, and other tubular structures and the like.

The present utility model relates to a sleeve connector having various cross-sections for tubular metal posts, characterized in that it provides a joining element between, at least, two tubular metal posts, having a centralization region in each end, two locking regions and an abutment region, in which an interference is established between each tubular element and the locking region elements in order to obtain the locking of the tubular elements by means of the mechanical deformation of the locking region elements.

Description of the Related Art

Different solutions are known from the state of the art when it comes to the joining of tubular posts as, for example, the solution disclosed by the patent document CN202144590, which is a metal connector for posts of different diameters. There are several apparent disadvantages in this solution, such as the difficulty in centralization of pieces to be joined and the fact that the joining of posts of different diameters is performed through welding its ends with the connector being in the contact region.

Other document regarding the pertinent state of the art is the patent document CN105421448, which describes a post structure formed by, at least, two posts joined together by a connector provided with fixation ring and sealing ring. Once more, there are disadvantages in that the joint depends on specific fixation means, adjustment and sealing services are required, and it lacks means for post centralization.

Another solution known from the state of the art is the fast connector described in CN205875142, which provides a connection of tubular structures through its internal diameters. The main disadvantage is that it is necessary to have special channels and internal geometries at the ends of the tubular pieces to be joined. In addition, there is no providing for any arrangement that facilitates centralization of the elements to be joined.

There is, therefore, a need for a sleeve connector having various cross-sections for tubular metal posts that facilitates the centralization of posts, eliminating the need for welding and/or the use of additional fixation elements, and is not dependent on internal or external geometry of tubular structures to be joined, therefore allowing for fast connection, even in adverse conditions, as the ones observed in building sites located in areas of difficult access, unfavorable weather and peculiar situations.

SUMMARY OF THE INVENTION

The objective of the present utility model is, therefore, to provide a connector sleeve having various cross-sections for tubular metal posts comprising a centralization region at each end, two locking regions and an abutment region.

BRIEF DESCRIPTION OF THE DRAWINGS

For better understanding and visualization of the object of the present utility model, the same will now be described with reference to the attached figures, representing the functional improvement obtained, in which, schematically.

DETAILED DESCRIPTION OF THE PREFERRED EMBODIMENT

Figure 1:
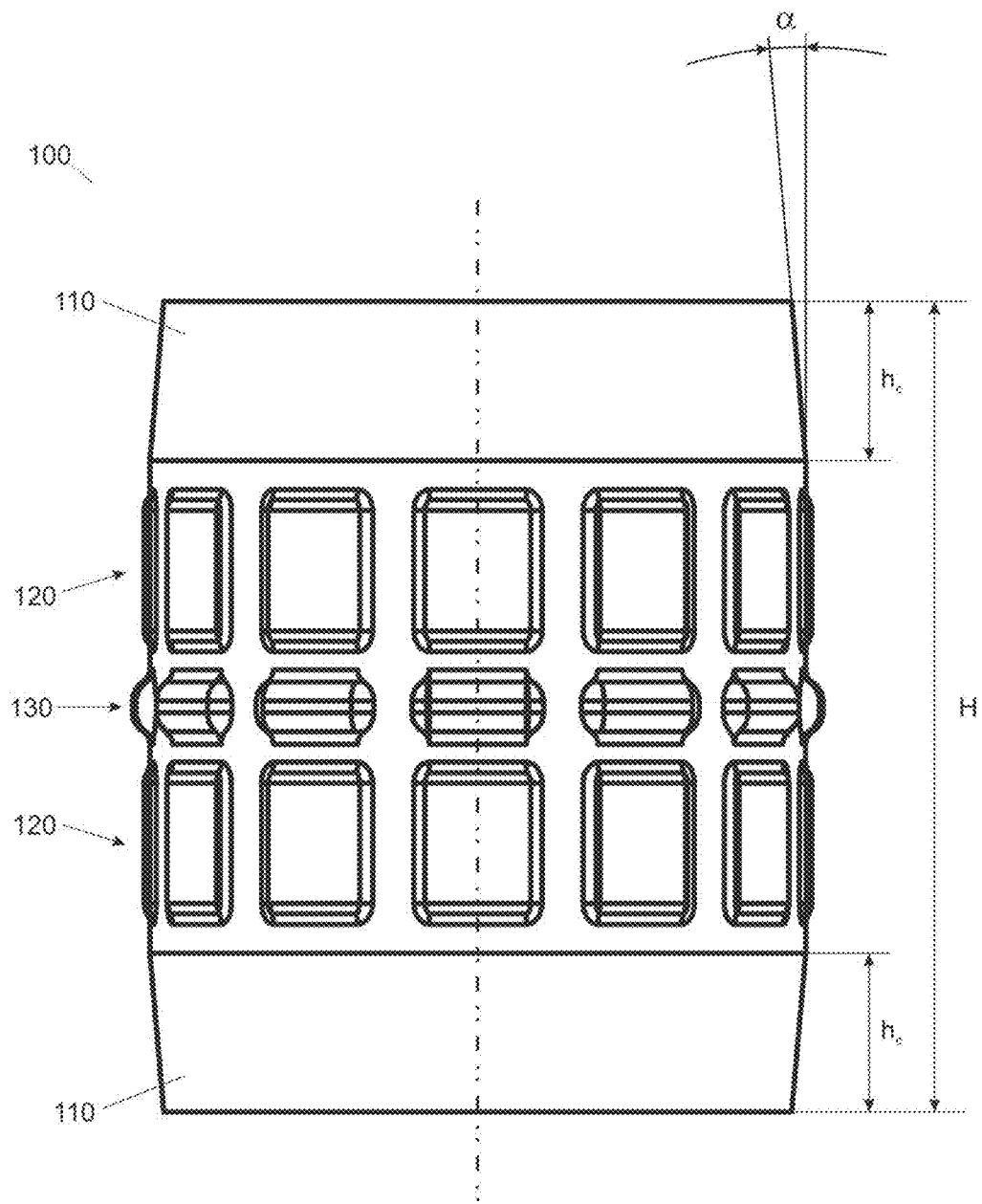
FIG. 1: presents a side view of a sleeve connector according to the utility model.
Figure 2:
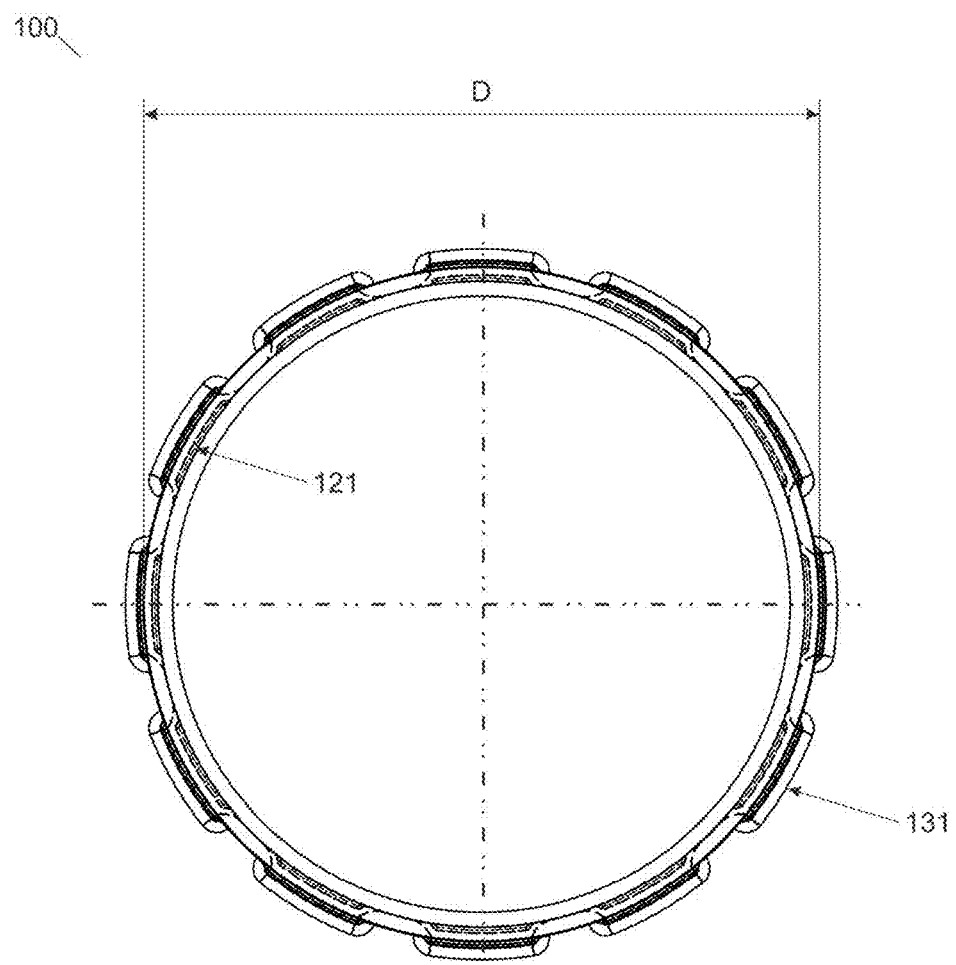
FIG. 2: presents a frontal view of a sleeve connector according to the utility model.
Figure 3:
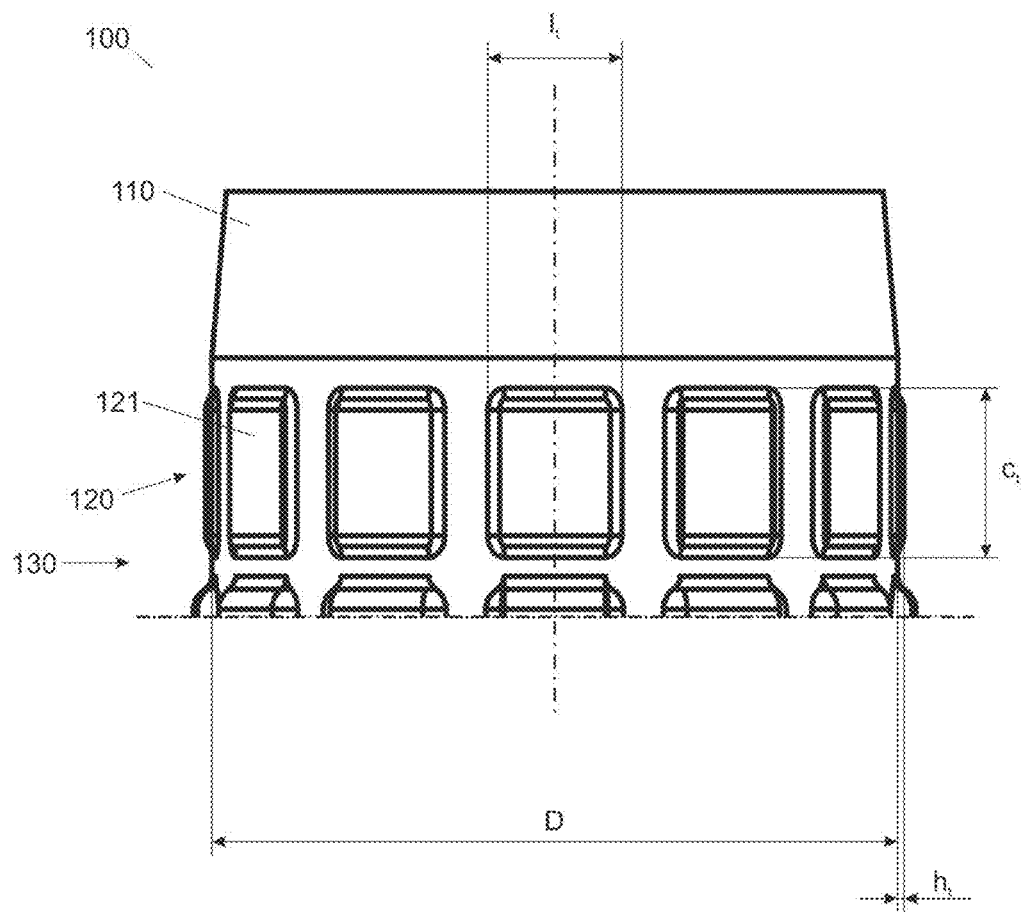
FIG. 3: presents a partial side view of a sleeve connector according to the utility model.
Figure 4:
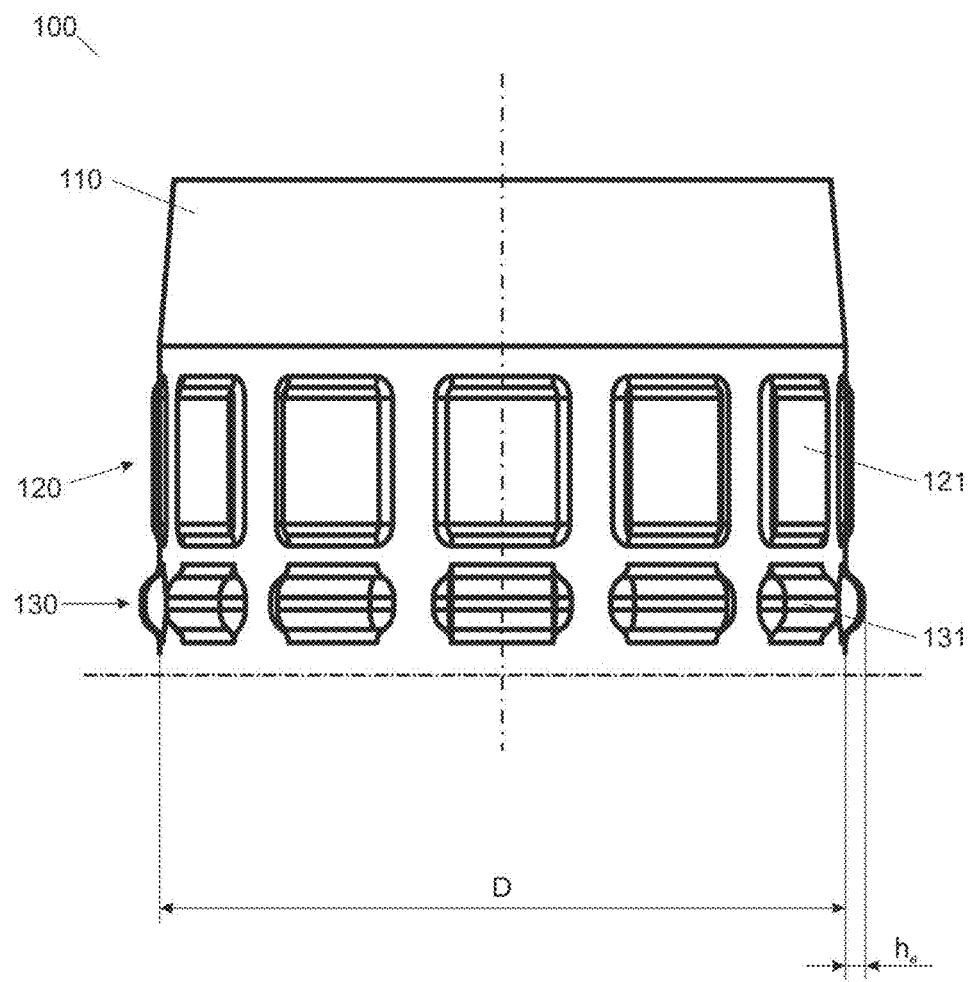
FIG. 4: presents a partial side view of a sleeve connector according to the utility model.
Figure 5:
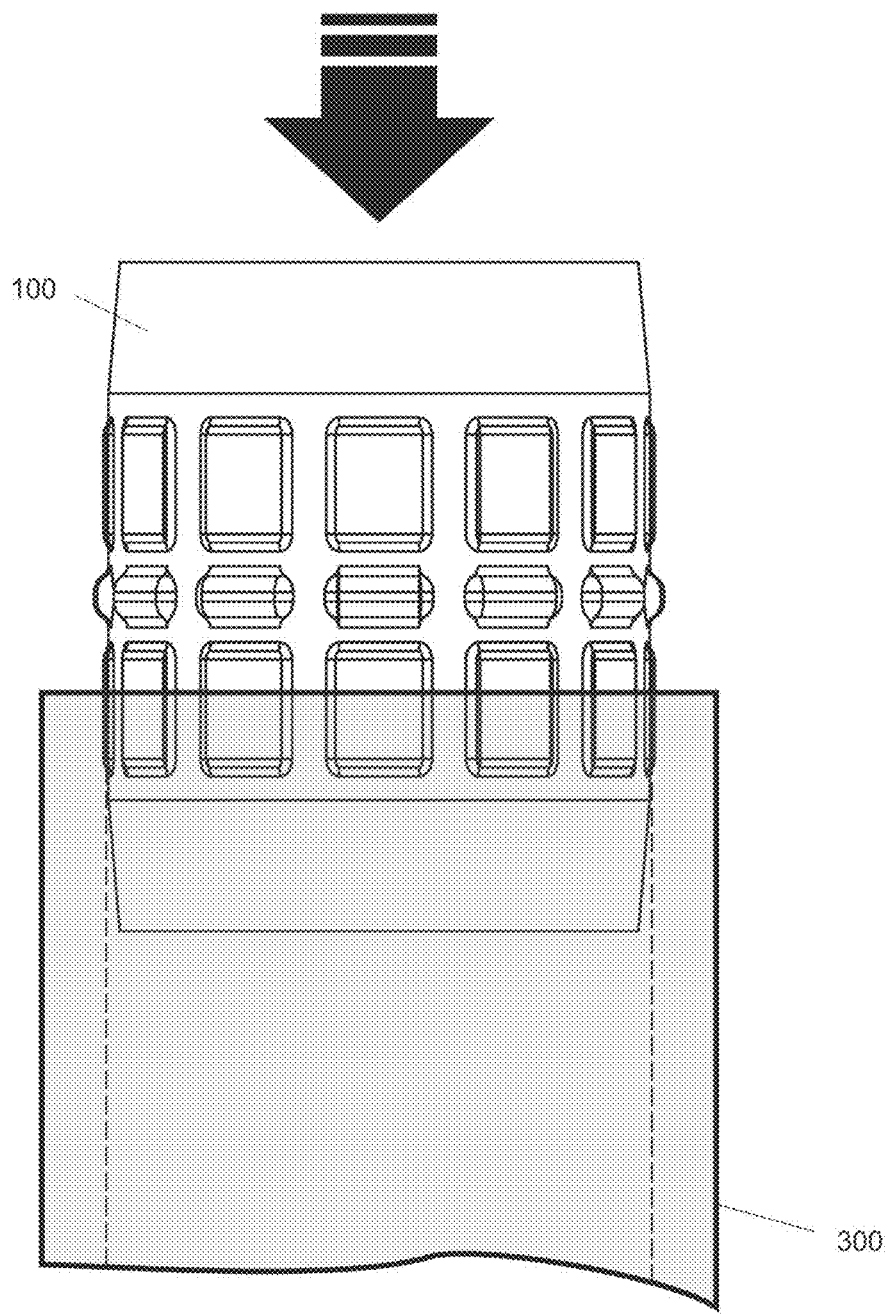
FIG. 5: presents a side view of the sleeve connector of FIG. 1 arranged in a tubular metal post, initiating the joining process.
Figure 6:
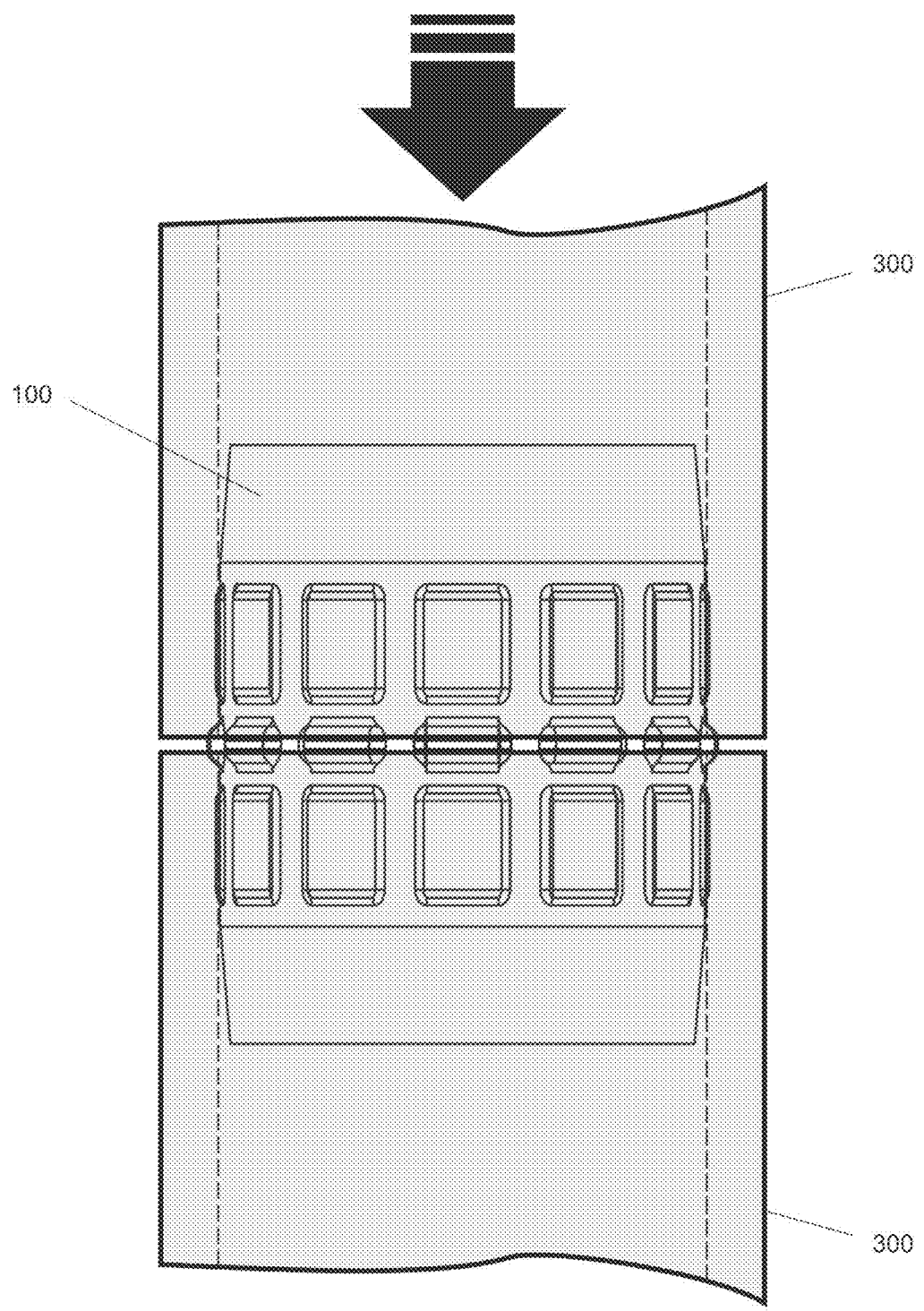
FIG. 6: presents a side view of the sleeve connector of FIG. 5 receiving the second tubular metal post, finishing the joining process.
Figure 7:
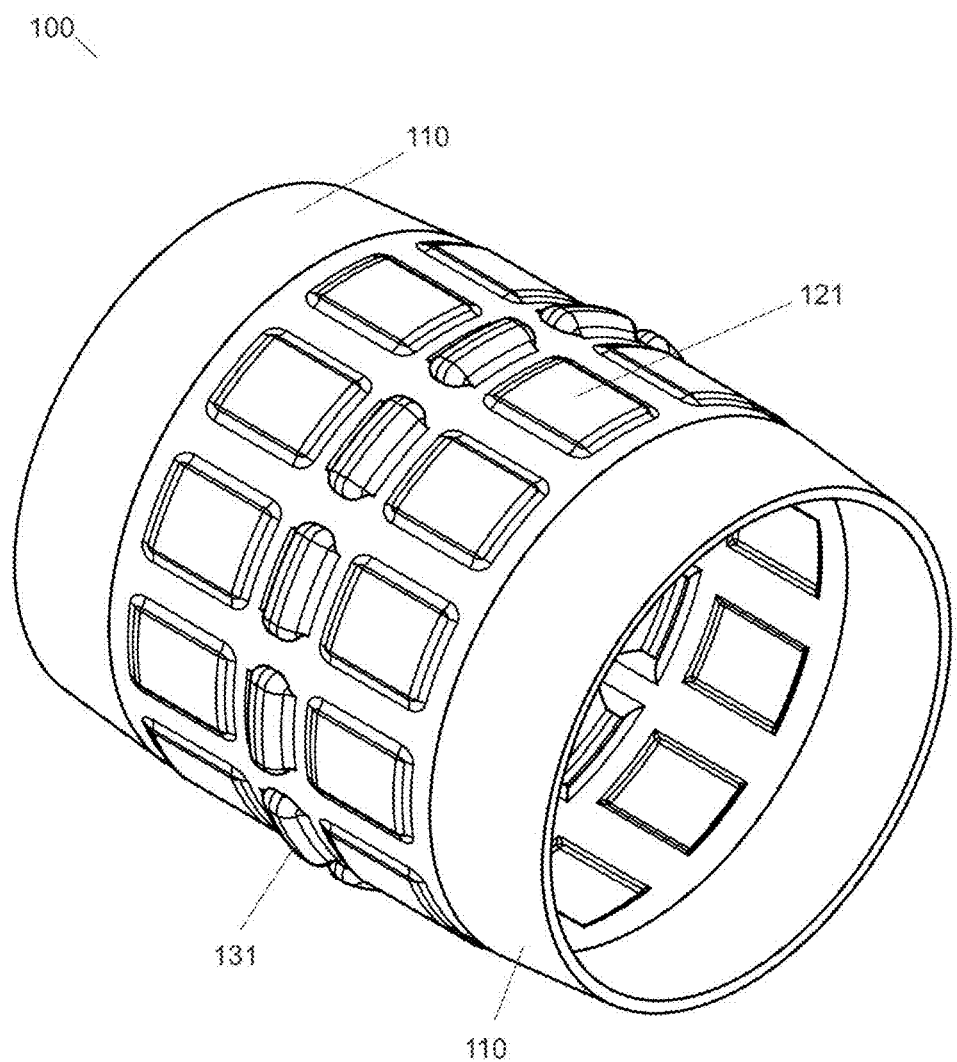
FIG. 7: presents a perspective view of a sleeve connector according to the utility model.
Figure 8:
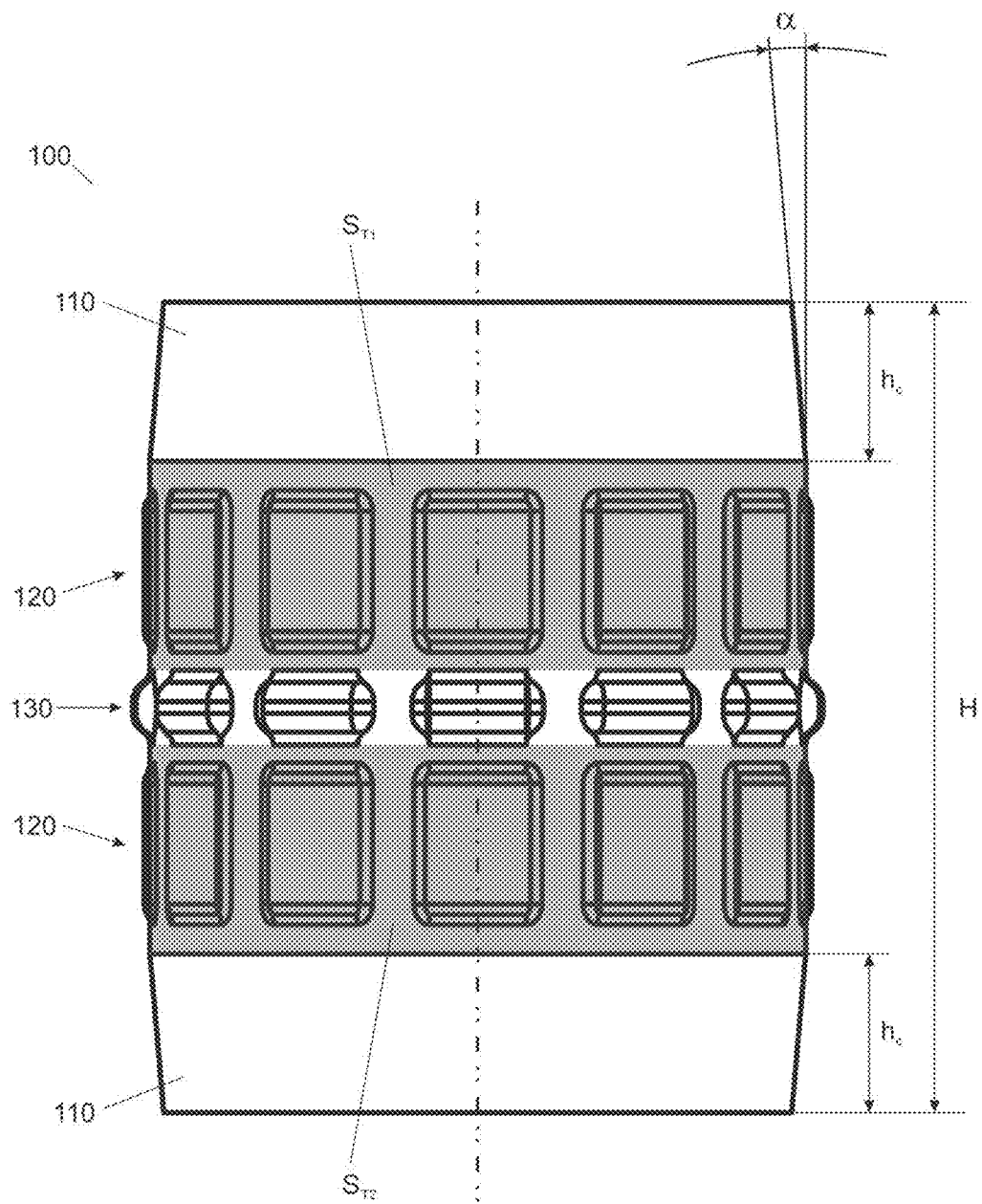
FIG. 8: presents a side view of a sleeve connector according to the utility model.

The sleeve connector for tubular metal posts or simply, the sleeve connector (100), according to the utility model, is a part intended for the mechanical joining of two tubular metal posts (300) and comprises, essentially, a total body height (H) provided with two centralization regions (110), two locking regions (120) and an abutment region (130).

Each centralization region (110) is located at one of the open ends of the sleeve connector (100), while the two locking regions (120) are adjacent to the respective regions of centralization (110) and equidistant from a central abutment region (130).

Each centralization region (110) is conical and presents a height ($h_c$) corresponding to 5 and 50%, preferably 15% of the locking region (120) external diameter (D) of the sleeve connector (100), while the inclination angle ($\alpha$) of the cone is between 2 and 40°, depending, specially, on the application and measurements of the components involved.

Each locking region (120) is provided with a plurality of locking protuberances (121), arranged in order to form a ring around the external perimeter of the locking region (120).

The measurements and the quantity of locking protuberances (121) are defined according to the application and, preferably, depending on the external diameter (D) of the locking region (120) which, in turn, depends on the internal diameter of the tubular metal posts (300) involved.

Each locking protuberance (121) presents a length ($c_t$) of 10 to 30%, preferably 20% of the external diameter (D), a width ($l_t$) of 6 to 20%, preferably 13% of the external diameter (D) and a height or radial distance ($h_t$), measured from the external perimeter of the locking region (120), which corresponds to a value between 0.15 and 4%, preferably, between 1 and 2% of the locking region (120)

external diameter (D). Thus, an interference capable of promoting the locking of the tubular metal post end (300) to be inserted in the sleeve connector (100) by means of mechanical deformation of the locking protuberances (121) is established.

Each locking region corresponds to an external surface ($S_{T1}$, $S_{T2}$), wherein the sum of the locking protuberance areas (121) shall be equivalent to a value between 60 and 100% of the sum of the external surfaces ($S_{T1}$, $S_{T2}$).

The abutment region (130) is provided with a plurality of abutment protuberances (131), arranged in order to form a ring around the external perimeter of the abutment region (130).

Each abutment protuberance (131) presents a height or radial distance ($h_e$), measured from the external perimeter of the locking region (120), which corresponds to a value between 30 and 80%, preferably 60% of the wall thickness of the tubular metal post (300) involved. Thus, an interference capable of providing an abutment stopper for the tubular metal post (300) end to be inserted in the sleeve connector (100) is established.

Final Considerations

It is clear that the measures and relations between measures described for the present structural arrangement may vary according to the dimensioning of the sleeve connector (100) which, in turn, depends on the dimensions of the tubular metal posts (300).

Extensive practical tests, however, have shown that said dimensions and their relations are highly efficient and effective.

In addition, the structural arrangement of the present utility model and said measurements and their relations are highly reliable and reproducible.

Conclusion

As it can be inferred from the description above, the structural arrangement according to the present utility model surpasses the solutions in the state of the art, being an object of practical use, perfectly suitable for industrial application, presenting a new arrangement, involving non-obviousness and resulting in a functional improvement of use.

What is claimed is:

1. A sleeve connector having various cross-sections for joining tubular metal posts, the sleeve connector (100) comprising:

one or more locking regions (120) provided with a ring of radially outwardly protruding and circumferentially spaced apart locking protuberances (121), wherein the locking protuberances (121) are formed prior to locking together ends of two tubular metal posts (300) with the sleeve connector (100) and have a maximum radial height ($h_t$) that corresponds to 0.15 to 4% of the external diameter (D) of the respective locking region (120), said locking regions (120) being configured for locking together the ends of the tubular metal posts (300) by means of the mechanical deformation of the locking protuberances (121);

a pair of conical centralization regions (110) at opposite ends of the sleeve connector (100), the one or more locking regions (120) disposed between the pair of centralization regions (110); and an abutment region (130) having one or more radially protruding and circumferentially arranged abutment protuberances (131) having a maximum radial height ($h_e$) that is different than the maximum height of the locking protuberances and that corresponds to a value between 30 and 80% of a wall thickness of the tubular metal posts (300).

2. The sleeve connector (100) of claim 1, wherein the one or more locking regions (120) are a pair of locking regions (120) adjacent the pair of centralization regions (110) and equidistant from the abutment region (130).

3. The sleeve connector (100) of claim 2, wherein the centralization regions (110) are conical and present an axial height ($h_c$) corresponding to a value between 5 and 50% of the respective locking region (120) external diameter (D).

4. The sleeve connector (100) of claim 1, wherein the centralization regions (110) are conical and present an axial height ($h_c$) corresponding to a value between 5 and 50% of the respective locking region (120) external diameter (D).

5. The sleeve connector (100) of claim 1, wherein the abutment protuberances (131) are spaced from the locking protuberances (121), and wherein the locking regions (120) are disposed between the pair of centralization regions (110) and the abutment region (130).

* * * * *